Nov. 23, 1926.  
F. K. YOUNG  
1,608,080  
ANTITHEFT DEVICE FOR MOTOR VEHICLES  
Filed Feb. 18, 1924
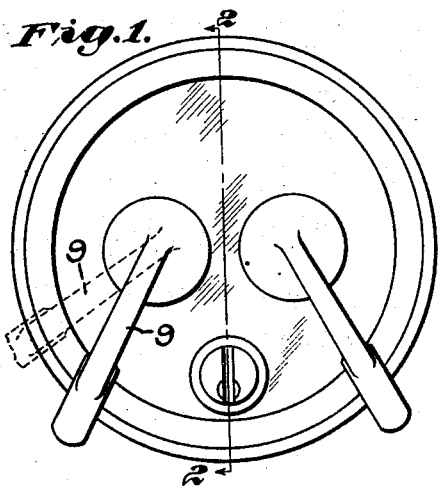
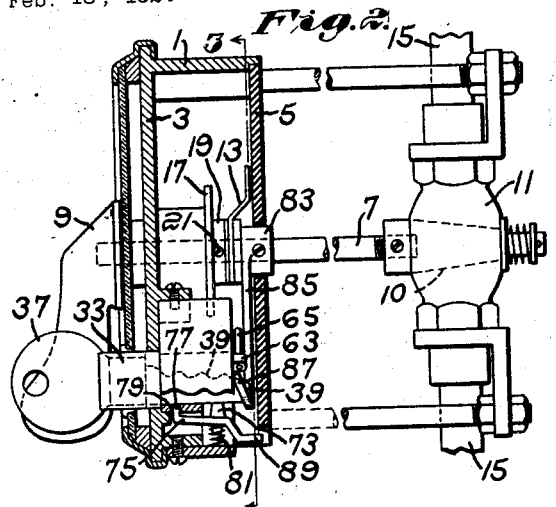
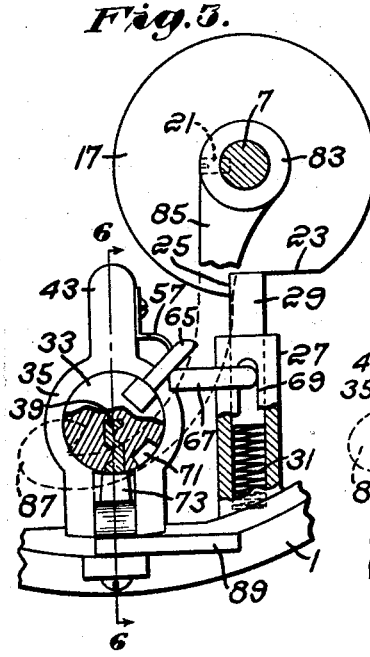
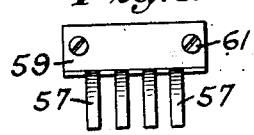
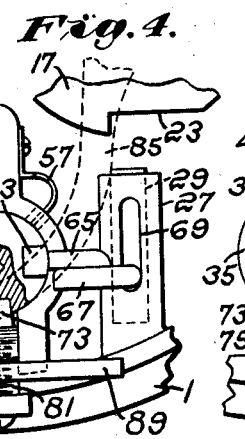
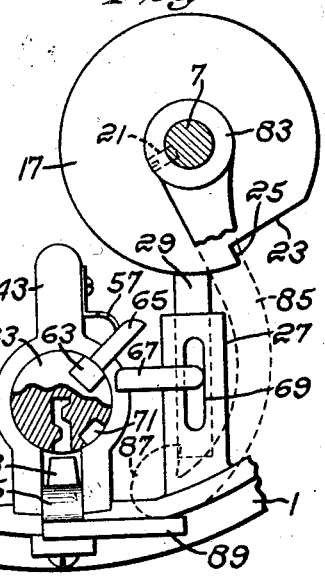
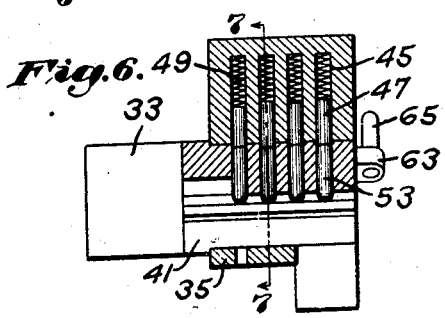
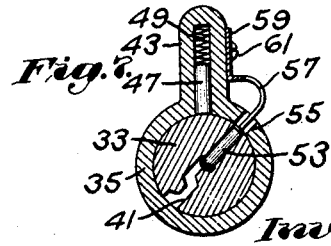
Inventor:  
Franklin K. Young,  
by Emery Booth Janney & Varney  
Attys.

Patented Nov. 23, 1926.

1,608,080

UNITED STATES PATENT OFFICE.

FRANKLIN K. YOUNG, OF WINTHROP HIGHLANDS, MASSACHUSETTS, ASSIGNOR TO CHARLES G. WELLS, OF BOSTON, MASSACHUSETTS.

ANTITHEFT DEVICE FOR MOTOR VEHICLES.

Application filed February 18, 1924. Serial No. 693,426.

My invention relates to key controlled mechanisms and particularly but not exclusively to a key controlled mechanism for controlling the actuating mechanism of a motor vehicle.

My invention will be best understood from the following description when read in light of the accompanying drawings showing one specific embodiment of my invention selected for illustrating purposes, while the scope of my invention will be more particularly pointed out in the appended claims.

In the drawings:—

Fig. 1 shows a front view of an ignition switch;

Fig. 2 is a section on the line 2—2 of Fig. 1;

Fig. 3 is a fragmentary section on the line 3—3 of Fig. 2 with the back plate removed;

Figs. 4 and 5 are sections corresponding to Fig. 3 but respectively showing the parts in different positions;

Fig. 6 is a section on the line 6—6 of Fig. 3;

Fig. 7 is a section on the line 7—7 of Fig. 6; and

Fig. 8 shows a detail.

Referring to the drawings, which show the particular embodiment of my invention selected for illustrating my invention, I have shown a casing 1 which in practice is attached in the usual manner to the instrument board of a motor vehicle, the casing having a front plate 3 and a removable back plate 5.

Extending through the casing is a shaft 7 which at its forward end carries an operating lever 9 so that the shaft may be rotated. Rearwardly of the casing the shaft is attached to a valve 10 of the turning plug type mounted in a valve casing 11, and interiorly of the casing the shaft 7 carries switch mechanism 13.

In practice the switch mechanism 13 is employed for establishing or interrupting the ignition circuit, while the fuel controlling valve 10 is employed for establishing or interrupting communication between the engine and the fuel supply, the valve casing 11 as illustrated being placed in a pipe line 15 which may lead from the vacuum tank to the carburetor. In practice when applying my invention to internal combustion engine driven motor vehicles the possibility of operating the engine on the fuel stored in the carburetor by short circuiting the ignition switch can be eliminated by placing the fuel controlling valve in the engine intake pipe between the carburetor and the engine.

In practice when the operating lever 9 is in its intitial position indicated by full lines in Fig. 1 the switch mechanism 13 will interrupt the ignition circuit and the valve 10 will interrupt the engine fuel supply so that the motor will be rendered inoperative. When the controlling lever is moved to its final position indicated by dotted lines in Fig. 1 the ignition circuit will be established and likewise the fuel supply will be established, thus rendering the motor operative.

It will of course be understood that either the valve or ignition switch may be omitted; and that my invention not only may be applied to any controlling mechanism for rendering the actuating mechanism of the motor vehicle operative or inoperative, but may be applied to other forms of controlling mechanism as for example switches for lighting circuits and the like.

Referring particularly to Figs. 2 to 5 I have shown a disk 17 caried by the shaft 7 interiorly of the casing, the disk being formed with an integral hub portion 19 secured to the shaft by a set screw 21. As indicated in Figs. 2 to 5 inclusive the disk 17 is provided at its periphery with a notch 23, the notch providing a shoulder 25. Carried by the casing 1 and integrally formed therewith is a tubular part 27 which carries a reciprocatory bolt 29 adapted to enter the notch 23 and abut the shoulder 25 for locking the shaft 7 against rotation when the operating lever 9 is in its initial position as illustrated by full lines in Fig. 1. Beneath the bolt 29 is a compression spring 31 which presses the bolt outwardly so that it will automatically snap into the notch 23 when the control lever 9 is moved into its initial position.

For preventing unauthorized operation of ing the notch 23. It will be further observed that I have provided a key controlled lock exemplified by the barrel 33 with its associated detents 47 and tumblers 53, and have provided a secondary lock as exemplified by the bolt 73 which engages the recess 71 of the barrel.

It will be observed that in using a device constructed according to my invention the operator of the vehicle will first insert the key and turn the barrel from its initial to its final position, which will unlock the operating handle so as to permit it to be turned from its initial to its final position and thus enable the motor to be started. However before the operating lever can be moved from its initial to its final position the key must be removed from its operating position in the lock, and when the motor is stopped by turning the operating lever from its final to its initial position the device automatically locks without reinsertion of the key. This operation by enforcing withdrawal of the key from its operative position in the lock thus forcing the operator to move the key in the direction in which it is withdrawn insures that the key will be withdrawn before the motor is started and therefore will not be left in the lock after the motor is stopped.

It is believed that the operation of the device will be clear from the foregoing description. Briefly however Fig. 3 shows the parts in the locked position, the barrel 33 being in its initial position and the bolt 29 preventing movement of the operating lever from its initial position. Fig. 4 shows the parts in the position after the barrel has been turned to its final position and the key withdrawn, under which conditions the bolt 29 will have withdrawn from the notch 23, and the bolt 73 will have entered the recess 71 so as to prevent the bolt 29 snapping back into the notch 23. In the position shown by Fig. 5 the operating lever has been moved to its final position and the bolt 73 has been withdrawn from the notch 71 which releases the barrel and permits the bolt 29 to move against the cylindrical portion of the disk 17. In cases where the barrel turns freely the movement of the bolt 29 from the position shown by Fig. 4 to that shown by Fig. 5 is sufficient to throw the barrel into its initial position as illustrated in Fig. 5, but if this has not occurred the barrel will be turned to its initial position when the bolt 29 snaps into the notch 23 upon moving the operating lever back to its initial position.

Although I have described for purposes of illustration one specific embodiment of my invention it is to be understood that I am not limited thereby to its particular mechanical details, but that within the scope of my invention wide deviations may be made therefrom without departing from the spirit of my invention.

Claims—

1. The combination with controlling mechanism for rendering the actuating mechanism of a motor vehicle operative or inoperative, of manually operated means for actuating said controlling mechanism, said manually operated means having an initial position in which said controlling mechanism renders said actuating mechanism inoperative and a final position in which said controlling mechanism renders said actuating mechanism operative, key controlled mechanism for locking said manually operated means in its initial position, said key controlled mechanism having means actuated by said key when the latter is inserted and turned while said manually operated means is in its initial position to effect unlocking of said manually operated means and maintaining it unlocked after the key is withdrawn, means for insuring removal of said key before said manually operated means can be moved from its initial position, and means actuated by movement of said manually operated means for effecting locking of said manually operated means in its initial position by said key controlled mechanism without reinsertion of said key when said manually operated menas is moved to its initial position.

2. The combination with controlling mechanism for rendering the actuating mechanism of a motor vehicle operative or inoperative, of manually operated means for actuating said controlling mechanism, said manually operated means having an initial position in which said controlling means renders said actuating mechanism inoperative and a final position in which said controlling mechanism renders said actuating mechanism operative, key controlled mechanism including a lock and a key for said lock for controlling the movement of said manually operated means, said mechanism permitting said key to be inserted and turned for effecting unlocking of said manually operated means and maintaining it unlocked while said manually operated means is in its initial position and insuring removal of said key before said manually operated means can be moved to its final position, and said mechanism automatically without reinsertion of said key locking said manually operated means in its initial position when moved thereto from its final position.

3. The combination with controlling mechanism for rendering the actuating mechanism of a motor vehicle operative or inoperative, of manually operated means for actuating said controlling mechanism, said manually operated means having an initial position and a final position, mechanism including a lock and a key for said lock for squarely against the inner or bottom wall of the said socket. The operator then uses a hammer, striking the outer plug in the direction of the length of the axle whereby the wheel is jarred loose from the axle and the key thereof and may be quickly removed.

Having described the invention what is claimed is—

A device adapted to be used for removing a wheel from an axle upon which it is keyed comprising a body provided at its opposite ends with alined sockets of different sizes, and anvil plugs fitting in the sockets.

In testimony whereof I affix my signature.

CASH A. CLEMONS.

final position, means for automatically locking said barrel in each position, a key for unlocking said barrel when in its initial position and for turning it to its final position, means controlled by said barrel for unlocking said primary lock when said barrel is in its final position, means actuated by said manually operated means for enforcing removal of said key from its operative position to permit said manually operated means to be moved to its final position, and means for unlocking said barrel when said manually operated means is in its final position.

8. The combination with controlling mechanism, of operating means therefor, a key controlled lock mechanism for automatically without use of the key locking said operating means in one position, said lock mechanism having means permitting it to be unlocked and the key to be withdrawn without movement of said operating means when said operating means is in said position, means for insuring removal of said key before said operating means can be moved to another position, and means permitting said controlling means to be again moved to its first position without use of said key.

9. The combination with controlling mechanism, of operating means therefor, a key controlled lock mechanism for automatically without use of the key locking said operating means in one position, said lock mechanism having means permitting it to be unlocked and the key to be withdrawn without movement of said operating means when said operating means is in said position, means for insuring removal of said key before said operating means can be moved to another position, said lock having a rotating barrel, a casing for said barrel, key operated tumblers carried in tumbler recesses in said barrel, locking detents carried by said casing for engaging said tumbler recesses, said detents releasing said barrel when said key is inserted, and other recesses in said casing permitting movement of said tumblers when said key is withdrawn after said detents release said barrel and said barrel is rotated.

10. The combination with controlling mechanism, of operating means therefor, a key controlled lock mechanism for automatically without use of the key locking said operating means in one position, said lock mechanism having means permitting it to be unlocked and the key to be withdrawn without movement of said operating means when said operating means is in said position, means for insuring removal of said key before said operating means can be moved to another position, said lock having a rotating barrel, a casing for said barrel, key operated tumblers carried in tumbler recesses in said barrel, locking detents carried by said casing for engaging said tumbler recesses, said detents releasing said barrel when said key is inserted, and means permitting movement of said tumblers when said key is withdrawn after said detents release said barrel and said barrel is rotated.

11. The combination with controlling mechanism, of a key controlled lock mechanism for automatically without use of the key, locking said controlling mechanism in one position, said lock mechanism having means permitting said key to unlock said controlling mechanism and the key to be withdrawn without movement of said controlling mechanism, means to enforce removal of said key from its operative position before said controlling means can be moved to another position, and means permitting said controlling means to be again moved to its first position without use of said key.

12. The combination with controlling mechanism for rendering the actuating mechanism of a motor vehicle operative or inoperative, of manually actuated means for actuating said controlling mechanism, said manually actuated means having an initial position in which it renders said actuating mechanism inoperative and a final position in which it renders said actuating mechanism operative, a key controlled lock comprising a rotary barrel having an initial and a final position, tumblers for said barrel locking it automatically in its initial position, the key for said lock when inserted unlocking said barrel and permitting said barrel to be turned by said key to its final position, movable means cooperating with said key and manually actuated means for preventing movement of said manually actuated means until said key is withdrawn from its position in said barrel in which it operates said tumblers, a detent for locking said barrel in its final position, mechanism actuated by said movable means for actuating said detent for unlocking said barrel when said manually actuated means is moved to its final position, a detent automatically locking said manually actuated means in its initial position when said means is moved thereto, and mechanism actuated by turning of said barrel from its initial position for actuating said last named detent to unlock said manually actuated means and for causing said barrel to be moved from its final to its initial position when said manually actuated means is moved from its final to its initial position.

13. The combination with controlling mechanism for rendering the actuating mechanism of a motor vehicle operative or inoperative, manually operated means including a rotary shaft for actuating said controlling mechanism, said shaft having an initial position in which it renders said actuating mechanism inoperative and a final position in which it renders said actuating mechanism of a motor vehicle operative or inoperative, of a manually operated member for actuating said controlling mechanism, said member having an initial position in which said member renders said controlling mechanism inoperative and a final position in which it renders said controlling mechanism operative, detent means automatically locking said member in its initial position, key controlled mechanism actuating said detent means for unlocking said member and maintaining it unlocked after the key is removed while said member is in its initial position, and means actuated by turning of said member for insuring removal of the key from said key controlled mechanism before said member can be moved from its initial to its final position.

19. The combination with controlling mechanism for rendering the actuating mechanism of a motor vehicle operative or inoperative, of a manually operated member for actuating said controlling mechanism, said manually operated member having an initial position in which it renders said controlling mechanism inoperative and a final position in which it renders said controlling mechanism operative, key controlled locking means for locking said manually actuated member in its initial position, said locking means acting automatically without use of said key to lock said manually actuated means when the latter is moved to its initial position and permitting movement of said manually operated means from its initial to its final position after the key is withdrawn with said manually operated means in its initial position, movable means actuated by said manually operated means and cooperating with said key for enforcing removal of said key from its operative position in said locking means before said manually actuated means can be moved from either of its two mentioned positions to the other.

20. The combination with controlling mechanism for rendering the actuating mechanism of a motor vehicle operative or inoperative, of a manually operated member for actuating said controlling mechanism, said manually operated member having an initial position in which it renders said controlling mechanism inoperative and a final position in which it renders said controlling mechanism operative, key controlled locking means for locking said manually actuated member in its initial position, said locking means acting automatically without use of said key to lock said manually actuated means when the latter is moved to its initial position and permitting movement of said manually operated means from its initial to its final position after the key is withdrawn with said manually operated means in its initial position, movable means actuated by said manually operated means and cooperating with said key for enforcing removal of said key from its operative position in said locking means before said manually actuated means can be moved from its final to its initial position.

21. The combination with controlling mechanism for rendering the actuating mechanism of a motor vehicle operative or inoperative, key controlled locking mechanism effective without use of the key automatically to lock said controlling mechanism in its position in which it renders said actuating mechanism inoperative when the latter is moved to said position, said locking mechanism having means actuated by the key when the latter is inserted and turned while said locking means is in said position to effect unlocking of said controlling mechanism and maintaining it unlocked after the key is withdrawn, and means cooperating with the key and controlling mechanism for enforcing movement of said key by the operator from its operative position in said locking mechanism before said controlling mechanism can be moved to its position in which it renders said actuating mechanism operative.

22. The combination with controlling mechanism for rendering the actuating mechanism of a motor vehicle operative or inoperative, of manually operated means for actuating said controlling mechanism, said manually operated means having an initial position in which said controlling mechanism renders said actuating mechanism inoperative and a final position in which said controlling mechanism renders said actuating mechanism operative, key controlled mechanism for locking said manually operated means in its initial position, said key controlled mechanism having means actuated by said key when the latter is inserted and turned while said manually operated means is in its initial position to effect unlocking of said manually operated means and maintaining it unlocked after the key is withdrawn, means in the path of the key moving with said manually operated means while the latter is in its initial position and the key is inserted, and means actuated by movement of said manually operated means for effecting locking of said manually operated means in its initial position by said key controlled mechanism without use of the key when said manually operated means is moved to its initial position.

23. The combination with controlling mechanism for rendering the actuating mechanism of a motor vehicle operative or inoperative, of manually operated means for actuating said controlling mechanism, key controlled mechanism for locking said controlling mechanism in its position in which it renders said actuating mechanism inoperative, means in the path of the key movsquarely against the inner or bottom wall of the said socket. The operator then uses a hammer, striking the outer plug in the direction of the length of the axle whereby the wheel is jarred loose from the axle and the key thereof and may be quickly removed.

Having described the invention what is claimed is—

A device adapted to be used for removing a wheel from an axle upon which it is keyed comprising a body provided at its opposite ends with alined sockets of different sizes, and anvil plugs fitting in the sockets.

In testimony whereof I affix my signature.

CASH A. CLEMONS.